May 2, 1939.  F. M. OWEN  2,157,008
PIPE COUPLING
Filed June 7, 1937  2 Sheets-Sheet 1

Frank M. Owen
INVENTOR

BY Bernard P. Miller
ATTORNEY

May 2, 1939.  F. M. OWEN  2,157,008
PIPE COUPLING
Filed June 7, 1937  2 Sheets-Sheet 2

Frank M. Owen
INVENTOR

BY Bernard P. Mills
ATTORNEY

Patented May 2, 1939

2,157,008

UNITED STATES PATENT OFFICE 2,157,008

PIPE COUPLING

Frank M. Owen, Oklahoma City, Okla.

Application June 7, 1937, Serial No. 146,753

2 Claims. (Cl. 285—154)

My invention relates to means for sealing joints of high pressure pipe lines and their fittings.

In high pressure pipe lines, it is common practice to thread adjacent ends of the pipe sections into separable flanged elements and to accomplish connection of the elements by drawing them together with bolts. It is also usual practice to provide a packing means, such as a gasket, or as a metal ring seated in complemental grooves in the adjacent faces of the two flanges, for sealing against leakage between the two elements. This means of connecting the flanged elements has proven effectual, however, it has been found that in order to hold extremely high pressures, the pipe sections and their flanged elements must be so tightly screwed together that the threads of both are distorted or deformed. After once being connected it is, consequently, impossible to transfer one of the elements to another pipe section. It also frequently occurs that leakage develops in the threaded connections after the line has been assembled, due to the fact that the connections have not been made sufficiently tight.

It is therefore the prime object of the present invention to prevent leakage through the threaded connections.

Other objects of the invention are to provide a device of simple construction which will effectually seal both ends of the threaded portion of the connection; which will eliminate the necessity of distorting the threads in order to hold high pressures; the packing elements of which may be easily and quickly replaced; which will be strong and durable; and, which will be efficient in accomplishing all of the objects for which it is intended.

With these and other objects in view as will more fully appear hereinbelow, my invention consists in the construction, novel features and combination of parts hereinafter more fully described, pointed out in the claims hereto appended, and illustrated in the accompanying two-sheet drawing, in which:

Like characters of reference designate like parts in all of the figures.

Figure 1:
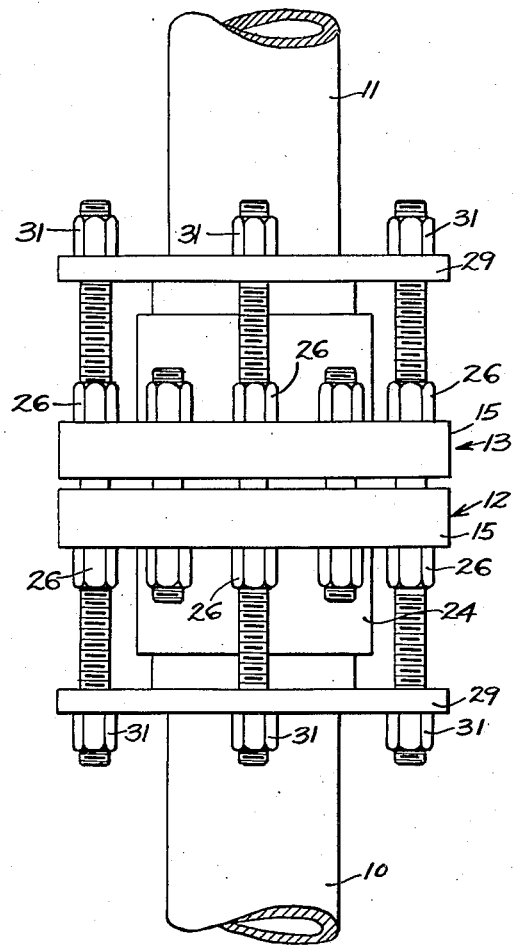
Figure 1 is an elevational view, of one embodiment of the invention.
Figure 4:
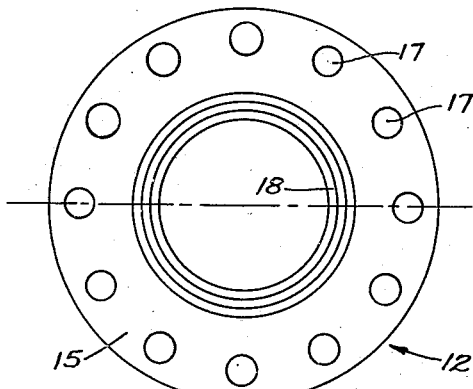
Figure 4 is an end view of one of the elements common to the embodiments shown in Figs. 1 and 3.
Figure 5:
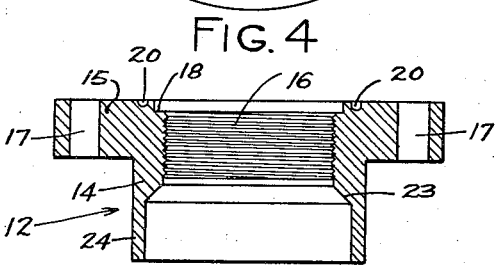
Figure 5 is an elevational sectional view of the element illustrated in Fig. 4.
Figure 6:
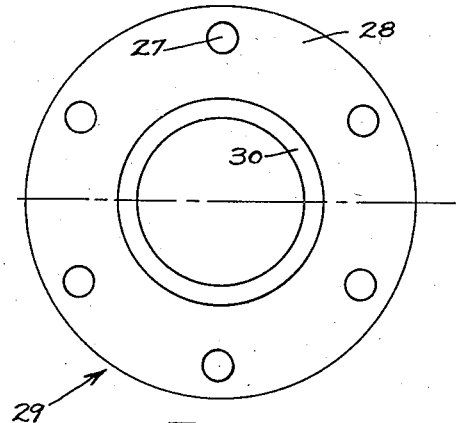
Figure 6 is an end view of a follower or packing compressing member which is used in the embodiments illustrated in Figs. 1 and 3.
Figure 8:
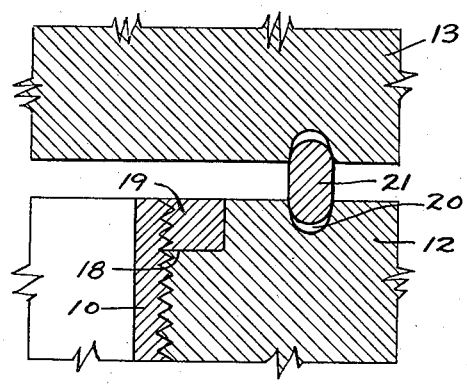
Figure 8 is an enlarged fragmentary sectional detail of a portion of the device.

In the drawings reference is first made to Fig. 1, wherein:

The reference numerals 10 and 11 indicate adjacent exteriorly threaded ends of two pipe sections, and the numerals 12 and 13 refer to axially bored elements into which the sections 10 and 11 are respectively threaded. The elements 12 and 13 are identical but are reversely positioned with relation to each other. One of these elements, for instance element 12, is best detailed in Figs. 4 and 5, and comprises substantially an interiorly threaded tubular body 14 having an integral outwardly extending perpendicular annular flange 15. The interior threads of the body 14 are indicated by the reference numeral 16 and the flange 15 is provided with a plurality of through perforations 17. The upper end of the bore of the body 14 is enlarged to form an annular shoulder 18 for receiving a compressible annular packing element 19 (Fig. 8) preferably formed of a soft metal such as lead. The upper flat surface of the flange 15 is provided with a usual superficial annular groove 20 (Fig. 8) for receiving a usual sealing ring 21 which is adapted to seal between the adjacent faces of the elements 12 and 13 when the elements are drawn together in a usual manner by a plurality of bolts 22 passing through the perforations 17 in both elements. (Fig. 1.)

The lower portion (Fig. 5) of the bore of the body 14 is tapered outwardly as illustrated at 23, and therebelow has a tubular extension 24 having an interior diameter somewhat greater than that of the threaded portion of the bore. When in use, the extension 24 forms an annular chamber or gland around the pipe section for receiving a resilient or fibrous packing element 25.

Figure 7:
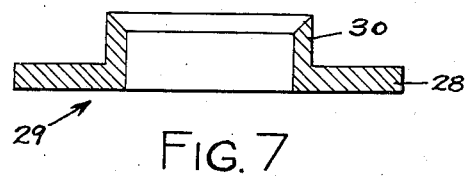
Figure 7 is an elevational sectional view of the member shown in Figure 6.

The office of bolts 22 hereinabove described was said to act in a "usual" manner in drawing the elements 12 and 13 together. This is true so far as their nuts 26 are concerned, however, each alternate one of the bolts 22 are somewhat longer than the bolts of usual flanged couplings, and extend through perforations 27 in the similar flanges 28 of identical oppositely disposed thrust elements or followers 29. Each of the followers 29 has a bevelled ended tubular portion 30 (Figs. 3 and 7) which contacts and is adapted to compress each packing element 25 into sealing engagement with the exterior surface of one of the pipe sections when nuts 31 are tightened.

Figure 3:
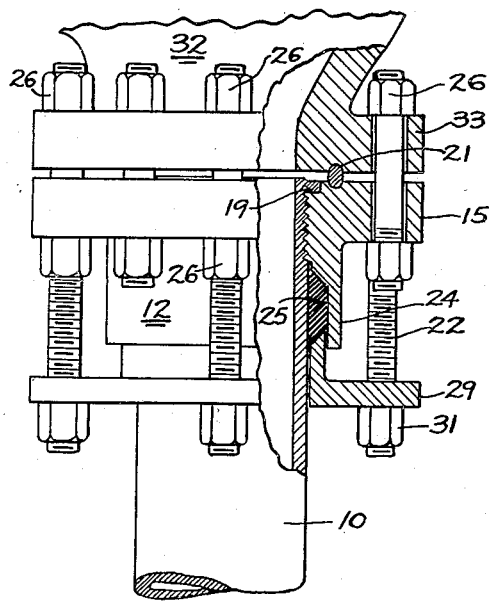
Figure 3 is a view similar to Fig. 2, showing a third embodiment.

In the embodiment illustrated in Fig. 3, instead of there being two of the pipe sections, and two oppositely disposed elements 12 and 13, a portion of a flanged gate-valve 32 or other fitting is shown as being installed upon the element 12. In this type of installation, the element 13 and the upper follower 29 and packing element 25 are omitted, and the upper nuts 26 bear directly upon a flange 33 of the valve.

It is thought that installation and operation of the device will be apparent from the above description, however, it may be well to explain that after installation, the line fluid is free to enter the space between the flanges 15 and is confined within this space by the sealing ring 21. Consequently, the fluid pressure acts upon the exposed end surface of the soft metal sealing or packing element 19 and, in high pressure lines, the pressure of the fluid is sufficient to deform the element 19 and cause it to flow into sealing engagement with the threads of the pipe section.

Figure 2:
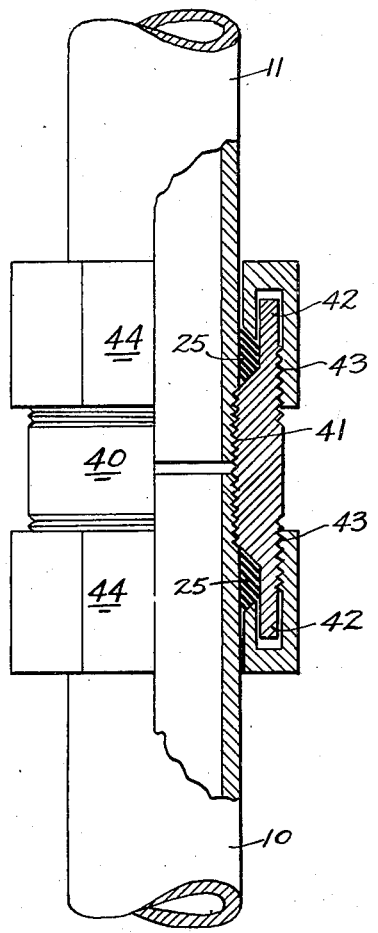
Figure 2 is a similar view partially in section, showing a slightly different embodiment.

In Fig. 2 is illustrated a slightly different embodiment of the invention, but one well within the scope of the claims and one utilizing similar mechanical principles to those disclosed in Figs. 1 and 3.

This embodiment is designed particularly for use in comparatively small pipe lines for carrying high pressures, and consists substantially of a sleeve 40 having interior threads 41 into which are screwed adjacent ends of the two pipe sections 10 and 11. The central portion or body of the sleeve has oppositely extending tubular portions 42 having inside diameters greater than the outside diameters of the pipe sections. Consequently a packing chamber is formed at each end of the threads 41 for receiving the packing elements 25. The exterior of the sleeve 40 is provided with two sets of threads 43 and each set receives a follower or compression nut 44 adapted to compress the packing 25 into sealing engagement with the exterior of the pipe section.

Obviously the invention is susceptible of embodiment in forms other than those shown in the drawings and described herein, therefore, I do not wish to limit the structure further than it is limited by the scope of the appended claims.

I claim:

1. A pipe coupling having an interiorly threaded portion, a pipe threaded therein, a tubular portion forming a continuation of said threaded portion and adapted to surround said pipe in spaced relation thereto, a packing within the tubular portion and around the pipe beyond the threads thereof, means for compressing said packing into sealing engagement with the pipe, and a ring of soft metal carried by the coupling, said ring adapted to be exposed to fluid pressure from the pipe and to be deformed by said pressure into sealing engagement with the threads of the pipe adjacent its end.

2. A pipe coupling having an interiorly threaded portion, a pipe threaded therein, a ring of soft metal carried by the coupling adjacent the end of the pipe, said ring adapted to be exposed to fluid pressure from the pipe and to be deformed by said pressure into sealing engagement with the threads of the pipe.

FRANK M. OWEN.